United States Patent
Tsao et al.

(10) Patent No.: US 7,236,491 B2
(45) Date of Patent: Jun. 26, 2007

(54) METHOD AND APPARATUS FOR SCHEDULING FOR PACKET-SWITCHED NETWORKS

(75) Inventors: Shih-Chiang Tsao, Hsinchu (TW); Ying-Dar Lin, Hsinchu (TW); Hai-Yang Huang, Hsinchu (TW); Chun-Yi Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 961 days.

(21) Appl. No.: 09/955,296

(22) Filed: Sep. 19, 2001

(65) Prior Publication Data
US 2002/0131413 A1  Sep. 19, 2002

Related U.S. Application Data

(60) Provisional application No. 60/253,930, filed on Nov. 30, 2000.

(51) Int. Cl.
*H04L 12/28* (2006.01)
*H04L 12/56* (2006.01)

(52) U.S. Cl. .............. 370/392; 370/229; 370/395; 370/428

(58) Field of Classification Search ........ 370/229–252, 370/322–392, 393–492, 412–428; 709/230–249
See application file for complete search history.

(56) References Cited

U.S. PATENT DOCUMENTS

| | | | | |
|---|---|---|---|---|
| 4,475,192 | A | * | 10/1984 | Fernow et al. ............. 370/232 |
| 5,042,032 | A | * | 8/1991 | Dighe et al. ............... 370/231 |
| 5,859,835 | A | * | 1/1999 | Varma et al. .............. 370/229 |
| 6,047,000 | A | * | 4/2000 | Tsang et al. ............... 370/412 |
| 6,134,217 | A | * | 10/2000 | Stiliadis et al. ............ 370/232 |
| 6,359,861 | B1 | * | 3/2002 | Sui et al. .................... 370/230 |
| 6,430,156 | B1 | * | 8/2002 | Park et al. .................. 370/232 |
| 6,438,134 | B1 | * | 8/2002 | Chow et al. ............... 370/412 |
| 6,470,016 | B1 | * | 10/2002 | Kalkunte et al. ...... 370/395.41 |
| 6,532,213 | B1 | * | 3/2003 | Chiussi et al. .......... 370/230.1 |

(Continued)

OTHER PUBLICATIONS

A. K. Parekh et al., "A generalized processor sharing approach to flow control in integrated services networks: the single-node case," *IEEE/ACM Trans. Networking*, pp. 344-357, Jun. 1993.

(Continued)

*Primary Examiner*—Man U. Phan
(74) *Attorney, Agent, or Firm*—Finnegan, Henderson, Farabow, Garrett & Dunner, L.L.P.

(57) ABSTRACT

Apparatus and method use pre-order queuing and scheduling. Reordering of the transmission sequence of packets that could be sent out in one round is allowed according to the quantum consumption status of the flow within the round. Per-packet time complexity is maintained independent from an increase in flow number and packets of variable-length are processed.

13 Claims, 7 Drawing Sheets

U.S. PATENT DOCUMENTS

| | | | |
|---|---|---|---|
| 6,532,501 B1* | 3/2003 | McCracken | 710/52 |
| 6,560,230 B1* | 5/2003 | Li et al. | 370/395.42 |
| 6,577,596 B1* | 6/2003 | Olsson et al. | 370/230 |
| 6,594,701 B1* | 7/2003 | Forin | 709/232 |
| 6,654,374 B1* | 11/2003 | Fawaz et al. | 370/394 |
| 6,674,721 B1* | 1/2004 | Dittia et al. | 370/235 |
| 6,714,517 B1* | 3/2004 | Fawaz et al. | 370/236 |
| 6,765,915 B1* | 7/2004 | Metzger et al. | 370/395.43 |
| 6,785,232 B1* | 8/2004 | Kotser et al. | 370/230.1 |
| 6,888,806 B1* | 5/2005 | Miller et al. | 370/316 |
| 6,891,835 B2* | 5/2005 | Kalkunte et al. | 370/395.41 |
| 6,920,109 B2* | 7/2005 | Yazaki et al. | 370/230.1 |
| 6,940,861 B2* | 9/2005 | Liu et al. | 370/395.21 |
| 2001/0043564 A1* | 11/2001 | Bloch et al. | 370/230 |
| 2002/0012348 A1* | 1/2002 | Mizuhara et al. | 370/392 |
| 2002/0071387 A1* | 6/2002 | Horiguchi et al. | 370/229 |
| 2002/0075875 A1* | 6/2002 | Dravida et al. | 370/395.21 |
| 2003/0133406 A1* | 7/2003 | Fawaz et al. | 370/229 |
| 2003/0189947 A1* | 10/2003 | Beshai | 370/428 |
| 2004/0228274 A1* | 11/2004 | Yazaki et al. | 370/229 |
| 2005/0163049 A1* | 7/2005 | Yazaki et al. | 370/230 |

OTHER PUBLICATIONS

J. C. R. Bennett et al., "WF²Q: Worst-case fair weighted fair queueing," *Proc. IEEE INFOCOM '96*, pp. 120-128, San Francisco, CA, Mar. 1996.

S. J. Golestani, "A self-clocked fair queueing scheme for broadband applications," *Proc. INFOCOM '94*, pp. 636-646, Jun. 1994.

L. Zhang, "Virtual Clock: A new traffic control algorithm for packet-switched networks," *ACM Trans. on Computer Systems*, vol. 9, No. 2, pp. 101-124, May 1991.

M. Shreedhar et al., "Efficient fair queueing using deficit round-robin," *IEEE/ACM Trans. Networking*, vol. 4, No. 3, pp. 375-385, Jun. 1996.

D. Stiliadis et al., "Efficient fair queueing algorithms for packet-switched networks," *IEEE/ACM Trans. Networking*, vol. 6, No. 2, pp. 175-185, Apr. 1998.

S. Suri, et al. "Leap forward virtual clock: a new fair queueing scheme with guaranteed delays and throughput fairness," *Proc. INFOCOM '97*, pp. 557-565, Apr. 1997.

D. Stiliadis et al., "Latency-rate servers: a general model for analysis of traffic scheduling algorithms," *IEEE/ACM Trans. Networking*, vol. 6, No. 5, pp. 611-624, Oct. 1998.

N. Matsufuru et al. "Efficient fair queueing for ATM networks using uniform round robin," *Proc. INFOCOM '99*, pp. 389-397, Mar. 1999.

M. Katevenis et al., "Weighted round-robin cell multiplexing in a general-purpose ATM switch chip," *IEEE Journal on Selected Areas in Communication*, vol. 9, No. 8, pp. 1265-1279, Oct. 1991.

H. M. Chaskar et al., "Fair scheduling with tunable latency: A Round Robin approach," *IEEE Globecom '99*, pp. 1328-1333, Dec. 1999.

J. C. R. Bennett et al., "High speed, scalable, and accurate implementation of packet fair queueing algorithms in ATM networks," *Proc. ICNP '97*, pp. 7-14, Oct. 1997.

V. Nageshwara Rao et al., "Concurrent accesss of priority queues," *Trans. on Computers*, vol. 37, No. 12, pp. 1657-1665, Dec. 1988.

J. L. Rexford et al., "Hardware-efficient fair queueing architectures for high-speed networks," *Proc. INFOCOM '96*, pp. 638-646, Mar. 1996.

* cited by examiner

METHOD AND APPARATUS FOR SCHEDULING FOR PACKET-SWITCHED NETWORKS

REFERENCE TO RELATED APPLICATIONS

This application claims priority from now abandoned prior provisional application Ser. No. 60/253,930, filed Nov. 30, 2000 for "PRE-ORDER DEFICIT ROUND ROBIN: A NEW SCHEDULING ALGORITHM FOR PACKET-SWITCHED NETWORKS."

FIELD OF THE INVENTION

This invention relates generally to packet scheduling. In particular, the invention relates to a packet scheduling method and apparatus for packet switched networks.

BACKGROUND OF THE INVENTION

In recent years, many packet scheduling algorithms have been proposed to reduce congestion, minimize delay (i.e., latency), and maintain fairness, especially to accommodate a high number of packet flows. Unfortunately, many of these algorithms can only be applied to fixed-size packets. Furthermore, many of these algorithms (even if they do not require fixed sized packets) exhibit poor performance as the number of packet flows increases.

Deficit Round Robin (DRR) is an algorithm which allows for variable-sized packets. Under DRR, a node rotationally selects packets to send out from all flows that have queued packets. During a round, each flow accumulates credits in discrete increments (e.g., in bytes) called a quantum. Unfortunately, DRR typically requires a quantum value that is very large, i.e., many times the size of the maximum packet size for a flow. The data presented in Table 1 below illustrates the above problem.

TABLE 1

THE TRAFFIC PARAMETERS AND QUANTUM SIZE OF 4 FLOWS

| Flow ID | Reserved Rate (Mbps) | Traffic Type | Maximum Packet Size (byte) | Ratio of Max Packet Size to Reserved Rate | Quantum Size (byte) |
|---|---|---|---|---|---|
| A | 128 | CBR | 400 | 250 | 512 |
| B | 16 | CBR | 640 | 320 | 640 |
| C | 64 | CBR | 800 | 100 | 2560 |
| D | 64 | CBR | 100 | 125 | 2560 |

The data in Table 1 assumes four flows, sharing the same link, and a link capacity of 160 megabits per second. As illustrated in Table 1, the quantum size of a flow can reach very large values relative to the flow's maximum packet size. For example, flow D has a quantum size of 25.6 times (2560/100) the maximum packet size. Unfortunately, due to the large quantum size required by DRR, DRR's performance can be poor compared to other algorithms such as Self-Clocked Fair Queuing (SCFQ) and Weighted Fair Queuing (WFQ).

However, simply reducing the quantum size also creates problems and is generally ineffective. For example, reducing the quantum size can cause a node using DRR to select no packets to send out after querying all flows in a particular round. This causes unacceptable delay and, again, causes poor performance. Thus, simply reducing the quantum sized used in a DRR node is generally not effective. Accordingly, it would be desirable to provide a scheduling algorithm and apparatus which does not require fixed size packets and exhibits good performance, including when there is a high number of packet flows.

SUMMARY OF THE INVENTION

In accordance with the invention, a method for scheduling a packet, comprises: receiving a packet; identifying a flow for the packet; classifying the packet based on the identified flow; and buffering the packet in one of a plurality of queues based on the classification of the packet.

In accordance with another aspect of the present invention, a system for scheduling a packet, comprises: an input to receive a plurality of packet; an arrival module to identify a flow for each of the plurality of packets; a classifier to assign each of the plurality of packets to one of a plurality of queues based on the identified flow; a server for selecting one of the plurality of queues based on a hierarchical order; and an output for outputting a packet from the selected queue.

In accordance with yet another aspect of the present invention, an apparatus for scheduling a packet, comprises: means for receiving a packet; means for identifying a flow for the packet; means for classifying the packet based on the identified flow; and means for buffering the packet in one of a plurality of queues based on the classification of the packet.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 4b shows the present invention using PDRR operating on the same input pattern and assumptions used in FIG. 4a;

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Embodiments consistent with the present invention provide pre-order deficit round robin (PDRR) architecture to execute a scheduling algorithm which minimizes delay while maintaining fairness in a packet switched network. Embodiments consistent with the present invention use O(1) per-packet time complexity in most cases (i.e., as the number of packet flows increases) and is amenable to variable-length packets.

Analysis results from testing embodiments consistent with the present invention with respect to three measures, including latency, fairness and per-packet time complexity are also provided. The analysis results provide supporting evidence that embodiments consistent with the present invention offer better performance in latency, fairness and lower time complexity. Furthermore, simulation results are provided to demonstrate the behavior of embodiments consistent with the present invention.

Figure 1:
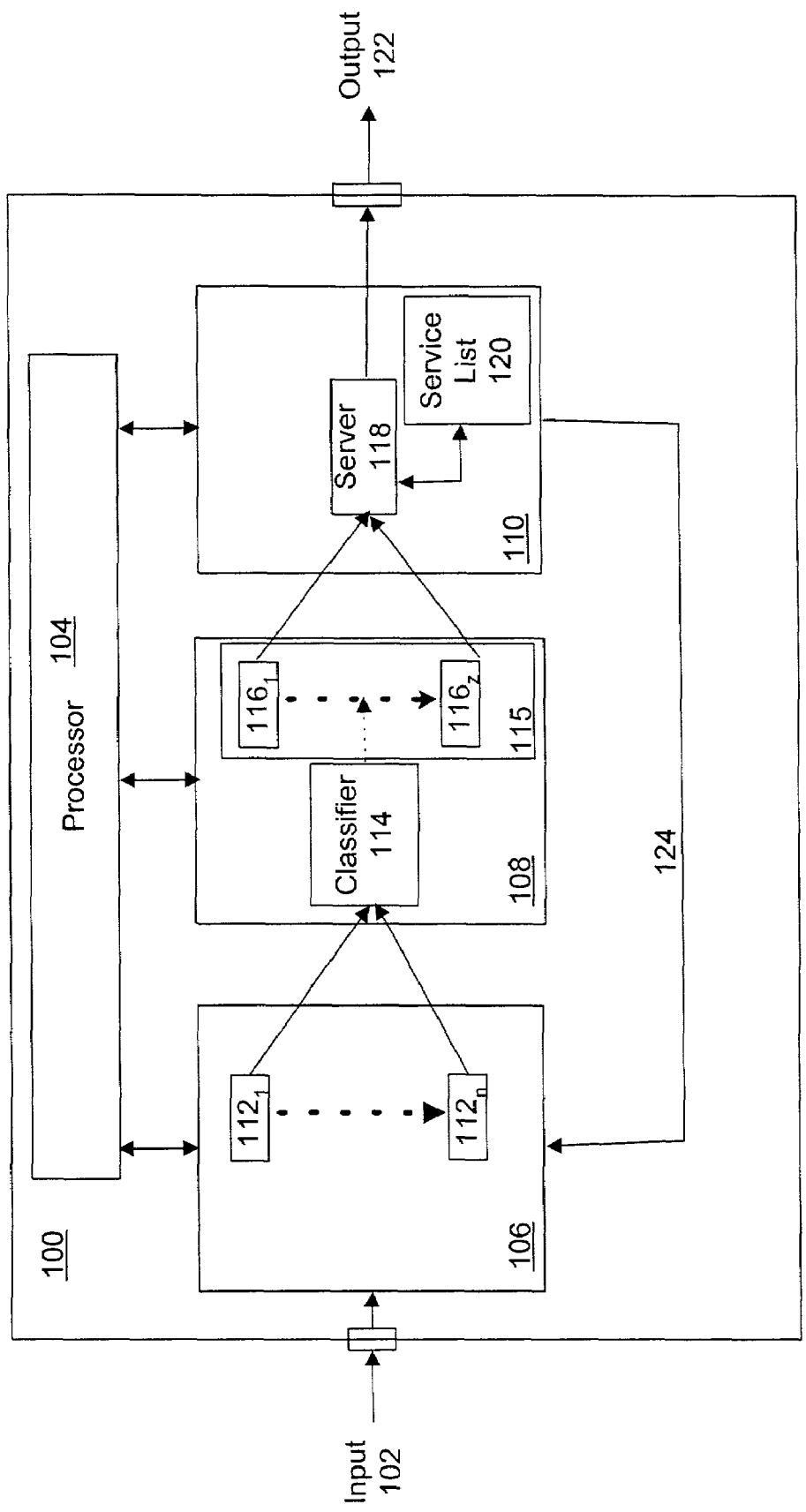
FIG. 1 illustrates a node 100 utilizing a Pre-Order Deficit Round Robin (PDRR) architecture in accordance with principles of the present invention.

FIG. 1 illustrates a node 100 utilizing the PDRR architecture in accordance with principles of the present invention. In particular, node 100 comprises an input port 102, a processor 104, a packet arrival module 106, a pre-order queuing module 108, a packet departure module 110, and an output port 122.

Input port 102 interfaces node 100 to a link, e.g., to other nodes (not shown) and receives incoming packets. For purposes of illustration, node 100 is shown with one input port, i.e., input port 102. However, node 100 may be implemented with any number of input ports for receiving incoming packets.

Processor 104 performs various operations for receiving, scheduling, and passing packets. Processor 104 may be implemented using hardware logic in combination with software and an operating system. Examples of the operating system and software include the UNIX operating system and the LINUX operating system for executing code written using C and C++.

Packet arrival module 106 receives packets from input port 102, identifies each packet's flow, and places each packet in its corresponding flow queue. Packet arrival module 106 determines the number n and identification of flow queues $112_1$-$112_n$ based upon information received from packet departure module 110 via path 124. Packet arrival module 106 may also provide notification, e.g., to packet departure module 110 via processor 104, when a packet arrives for a new flow to be serviced by node 100. Furthermore, packet arrival module 106 may notify pre-order queuing module 108, e.g., if there are no other packets for a particular flow. As shown in FIG. 1, packet arrival module 106 comprises a set of flow queues $112_1$-$112_n$, where n is the number of flows currently being serviced by node 100. Packet arrival module 106 may be implemented using any combination of hardware logic and software. Packet arrival module 106 may use processing functions of processor 104 to execute instructions in software. Below is one example of pseudo-code called "PKT_Arrival" which may be used by packet arrival module 106 to place each packet into its corresponding flow Fq (i.e., one of flow queues $112_1$-$112_n$).

| PKT_Arrival module | |
| --- | --- |
| i←ExtractFlow(p) | // Get the flow # of packet p |
| Enqueue(p, $Fq_i$) | |
| If NumItem($Fq_i$)=1 Then<br>SendMsg(PKT_Pass, i) | // The equal implies that $Fq_i$ is empty before p was placed into it, and need to notify PACKET_Pass to handle the flow i |

Output port 122 outputs packets passed from node 100 on to a link, e.g., to other nodes. For purposes of illustration, node 100 is shown with one output port, i.e., output port 122. However, node 100 may be implemented with any number of output ports. In addition, node 100 may be implemented with dual purpose ports which function as both an input and output port.

Pre-order queuing module 108 places packets from non-empty flow queues $112$-$112n$ into a second set of queues. Pre-order queuing module 108 may process any size packet. Pre-order queuing module 108 comprises a classifier sub-module 114 and a priority queuing sub-module 115.

Classifier sub-module 114 retrieves packets from each non-empty flow queue, i.e., flow queues $112_1$-$112_n$, within packet arrival module 106, determines a priority for each packet, and places each packet in an appropriate priority queue, i.e., priority queues $116_1$-$116_z$, within priority queuing sub-module 115. In addition, classifier sub-module 114 may enable a packet (e.g., for a high priority flow) to be considered for transmission immediately. Priority queuing sub-module 115 maintains a number of priority queues $116_1$-$116_z$, where z is represents the number of priorities used by classifier sub-module 114.

Pre-order queuing module 108 may implement classifier sub-module 114 and priority queuing sub-module 115 in a wide variety of ways. For example, pre-order queuing module 108 may use processing functions of processor 104 and execute instructions in software. Below is one example of pseudo-code called "PKT_Pass" which may be used by pre-order queuing module 108. PKT_Pass decides to which class j a packet belongs and places the packet into the corresponding priority queue $Pq_j$ (i.e., priority queues $116_1$-$116_z$) from its Fq (i.e., flow queues $112_1$-$112_n$).

| PKT_Pass module | |
| --- | --- |
| While(TRUE) | |
| {i←WaitMsg( ) | // Wait until a packet is placed to the empty $Fq_i$ |
| If $Round_i \neq Round_{sys}$ | // Non-equivalent implies a new round is arrival |
| { $Round_i \leftarrow Round_{sys}$<br>$DC_i \leftarrow Max(DC_i, Quantum_i)$ | |
| }<br>While $DC_i > 0$ and NonEmpty($Fq_i$) | // Classify eligible packets into PQ |
| { PktSize←Size(Head($Fq_i$)) | // Get the size of the packet at head of $Fq_i$ |
| If (PktSize<$DC_i$) Then | // if flow i credits are enough to send out packets. |
| { $DC_i$←DC − PktSize | // Take out the used credits |
| j←Z − (DC,l $Pq_i$) | // Compute the j |
| Enqueue(Dequeue($Fq_i$), $Pq_j$) | // Move the head packet of $Fq_i$ to eligible $Pq_j$ |
| If NumItem($Pq_j$)=1 Then | //It implies that $Pq_j$ is empty and j is non-existed in<br>// the min heap before the last packt was placed into it |
| MH_Insert(j) | //Insert j to min heap |
| }<br>}<br>If NonEmpty($Fq_i$) Then | // Imply the residual credits are not enough |
| { Enqueue(i, AckList)<br>If NumItem(AckList)=1 Then SetEvent($EV_{actlist}$)<br>}<br>} | |

Packet departure module 110 retrieves packets from non-empty priority queues, i.e., priority queues $116_1$-$116_z$, within priority queuing sub-module 115 and outputs packets to output port 122. Packet departure module 110 comprises a server sub-module 118 and a service list 120.

Server sub-module 118 services in a round-robin fashion each non-empty priority queue among priority queues $116_1$-$116_z$. Server sub-module 118 refers to service list 120 to determine the non-empty priority queues. In one embodiment, server sub-module 118 declares a new "round" of service and services the non-empty priority queues among priority queues 116₁-116_z using, e.g., an algorithm similar to a deficit round robin (DRR) algorithm. Server sub-module 118 in conjunction with service list 120 may use a quantum and a deficit counter for each flow of packets to determine how a particular priority queue is serviced. The quantum represents a share of available bandwidth (e.g., in bytes) allocated to a flow within the period of one round. A quantum$_i$ for a flow i can be expressed as $$Quantum_i = \frac{r_i}{C} \times F, \qquad (1)$$

where $r_i$ is the rate allocated to flow i, C is the link service rate, and F is the frame size that represents the summation of quantums for all flows.

A flow accumulates shares of bandwidth (i.e., in quantum increments) during a round. The deficit counter accumulates any residual quantum of flow i in the (j−1)th round, which can be represented as DeficitCounter$_i^{j-1}$. The next time that flow i is serviced by a node, an additional DeficitCounter$_i^{j-1}$ bytes of data (i.e., incremented by quantum$_i$) can be sent out in the jth round. Server sub-module 118 verifies the size of the packet at the head of the priority queue ("head packet") currently being serviced. As described with reference to FIG. 3 below, server sub-module 118 also determines when a particular packet will be transmitted, e.g., via output port 122.

Server sub-module 118 maintains service list 120. As noted above, service list 120 includes data for all flows currently being serviced by node 100. For each flow, service list 120 may include a flow identifier, a deficit counter, and a quantum. If a flow has no packets, e.g., within flow queues 112₁-112$_n$, server sub-module 118 may delete the flow identifier from service list 120. Alternatively, when a packet arrives for a new flow, server sub-module 118 may add an identifier for the new flow to service list 120.

In one embodiment, server sub-module 118 updates the deficit counters (DeficitCounter$_i^j$) in service list 120 according to the equation:

DeficitCounter$_i^j$=DeficitCounter$_i^{j-1}$+Quantum$_i$.

As noted above, the quantum indicates the increments of shares of bandwidth accumulated by a particular flow. Server sub-module 118 calculates the quantum such that a packet can be processed in O(1) operations. The quantum for a flow may be larger than the maximum packet size within the flow so that at least one packet per backlogged flow can be served in a round. The quantum for any two flows i and j may be expressed by $$\frac{Quantum_i}{Quantum_j} = \frac{r_i}{r_j}. \qquad (2)$$

Even assuming that all flows begin heavily backlogged at time t, the principles of the present invention allow server sub-module 118 to exhibit good performance. That is, server sub-module 118 can send out the packet with the earliest virtual finishing timestamp first among the packets at the heads of all flow queues. Under the above heavy backlog assumption, the virtual finishing timestamp of a packet may be computed as $$TS_i^m = TS_i^{m-1} + \frac{L_i^m}{r_i}, \qquad (3)$$

where $TS_i^m$ denotes the timestamp of the mth packet of flow i after time t and, for all i, $TS_i^0$ is set to zero at time t, $r_i$ denotes the allocated rate of flow i, and $L_i^m$ denotes the size of the mth packet of flow i after time t. Equation (3), by substituting Acc$_i^m$ for $TS_i^m \times r_i$, is equivalent to $$\frac{Acc_i^m}{Quantum_i} = \frac{Acc_i^{m-1} + L_i^m}{Quantum_i}, \qquad (4)$$

where Acc$_i^m$ denotes the accumulated amount of data within a byte that flow i has sent out after transmitting the mth packet after time t. Assume that all m packets could be transmitted in the kth round. Equation (4), by replacing Acc$^m$ with DeficitCounter$_i^0$−DeficitCounter$_i^m$, is equivalent to $$\frac{DeficitCounter_i^m}{Quantum_i} = \frac{DeficitCounter_i^{m-1} - L_i^m}{Quantum_i}, \qquad (5)$$

where DeficitCounter$_i^m$ denotes the residual quantum of flow i in this round after it puts the mth packet into the Pre-order Queuing. To further illustrate the equivalence, the following definition is provided:

Definition 1: The Quantum Availability, QA$_i^m$, of the packet $P_i^m$ is the ratio of its DeficitCounter$_i^m$ to Quantum$_i$, i.e.

$$QA_i^m = \frac{DeficitConter_i^m}{Quantum_i}. \qquad (6)$$

Lemma 1: For any packet $P_i^m$, its Quantum Availability QA$^m$ satisfies $$0 \leq QA_i^m < 1.$$

Lemma 2: For the packet with the smallest timestamp in one round, its QA is the largest.

Accordingly, the server sub-module 118 selects the packet with the largest QA within one round to send out. However, to avoid having to search for the packet with the largest QA among all packets that could be sent out in a round, classifier sub-module 114 classifies packets into several classes according to their QA and places them into the corresponding priority queues, i.e., priority queues 116₁-116_z.

There are Z priority queues and, hence, Z classes. For the mth packet of flow i that can be sent out in this round, its class $n_i^m$ can be derived as $$n_i^m = Z - \lfloor QA_i^m \times Z \rfloor = Z - \left\lfloor \frac{DeficitCounter_i^m}{Pqg_i} \right\rfloor, \qquad (7)$$

where DeficitCounter$_i^m$ denotes the residual credits in byte for flow i in the kth round after the mth packet is placed into a priority queue, and Pqg$_i$ denotes the granularity of priority queue for flow i derived as $$Pqg_i = \frac{Quantum_i}{Z}. \qquad (8)$$

Below is one example of pseudo-code called "PKT_Departure" which may be used by packet departure module 110.

---

PKT_Departure module

```
While(TRUE)
{ If MH_Empty( ) Then              // Imply no packets can be placed
                                   into PQ
  { Round_sys←Round_sys+ 1         // Announce arrival of the new round
    EC←WaitEvents(EV_m,            // wait until a packet was placed in PQ or
    inheap, EV_actlist)            // any Fq's
    If ( EC = EV_actlist)          // Imply there are packets without sending
                                   out at last
    Then                           round
    { NumAckList←NumItem(AckList)  // There are NumAckList
                                   non-empty
                                   // Fq's at last round
      While(NumAckList>0)          //For non-empty Fq's at
                                   last round, accumulate
      { l←Dequeue(AckList)         // their residual credits for
        DC_i←DC_i + Quantum_i      using at this round
        SendMsg(PKT_Pass, l)       // Ack PKT_Pass to pass
                                   packets of Fq_i into PQ.
        NumAckList←NumAckList-1
      }
      WaitEvent(EV_minheap)        // Pause if no packets in PQ
    } // IF EC=EV_actlist
  } // IF MH_EMPTY
  WaitEvent(ServerIdle)            // Pause if the server is
                                   sending out a packet
  MH_Lock( ) //To avoid the MinHeapRoot being modified as
             MH_Delete( ) is involved.
  If Empty(Pq_MinHeapRoot) Then MH_Delete( )
  MH_Unlock( )
  Send(Dequeue(Pq_MinHeapRoot))    // Send out the packet in
                                   the Pq_j with the smallest j
                                   // among non-empty Pq_j
```

---

Tables 2 and 3 provide some definitions used by the pseudo-code modules described above.

TABLE 2

THE OPERATIONS USED IN PKT_ARRIVAL AND PKT_DEPARTURE AND PKT_PASS PROCEDURES

| Operation | Description |
|---|---|
| Enqueue, Dequeue, NonEmpty, Empty, Head | The standard Queue operations |
| NumItem(A) | Return the number of entries in the A |
| MH_Insert(x), MH_Delete(), MH_Empty() | The standard operations of the min heap |
| MinHeapRoot | The minimum value among nodes of the min heap |
| MH_Lock, MH_Unlock | After locking, only one module can access the min heap |
| SetEvent(ev) | Signal the event ev The event will remain until signaled someone releases it |
| EventCase = WaitEvents(ev1, ev2, .) | Once any event is in the signaled state, return it to EventCase and release it Note ev1 is prior to ev2 |
| SendMsg(x,y) | Send message along with value y to x |
| y = WaitMsg() | Wait message and store the received value in y |

TABLE 3

THE VARIABLES USED IN PKT_ARRIVAL AND PKT_DEPARTURE AND PKT_PASS PROCEDURES

| Variable | Description |
|---|---|
| $Fq_i$ | The queue of flow i, i = 1 N |
| $Pq_j$ | Priority queue j, j = 1 Z |
| $Quantum_i$ | The created allocated to flow i in one round |
| $DC_i$ | The DeficitCounter of that flow i |
| $Pqg_I$ | The granularity of priority queue for flow I |
| Z | The number of priority queues |
| $Round_{cur}$ | The identification of the system current round |
| $Round_I$ | The identification of the mood of flow I |
| $EV_{minheap}$ | A event signaled as one key was placed into the empty min heap |
| $EV_{actlist}$ | A event signaled as one item was placed into the empty ActList |

Figure 2:
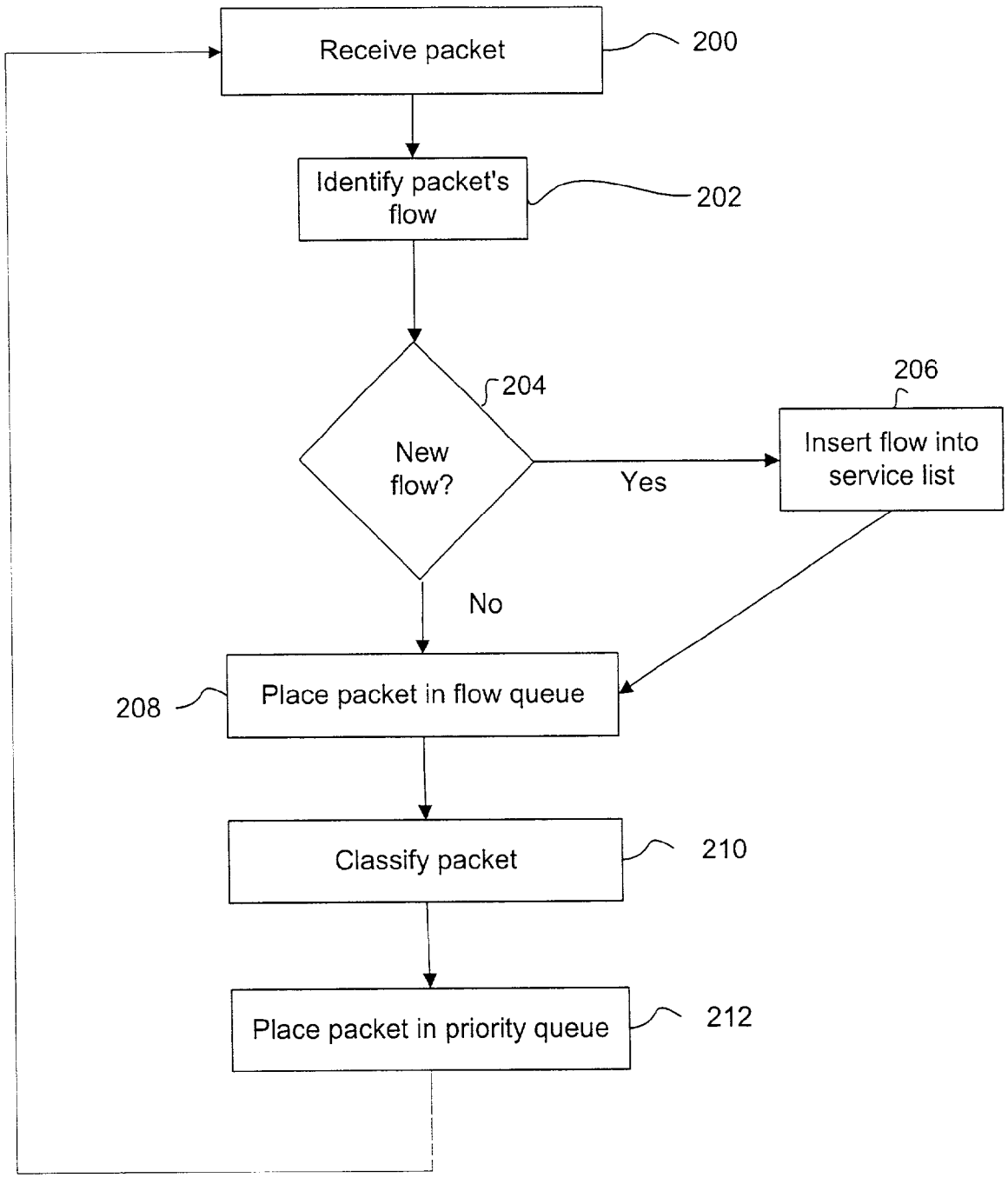
FIG. 2 shows a method for scheduling packets in accordance with principles of the present invention.

FIG. 2 shows a method for scheduling packets in accordance with the principles of the present invention. In step 200, input port 102 receives a packet and provides the packet to packet arrival module 106. In step 202, packet arrival module 106 identifies the packet's flow. In step 204, packet arrival module 106 determines whether the packet's flow is a new flow or a pre-existing flow. For example, packet arrival module 106 may work in conjunction with processor 104 to check service list 120. If the flow is not found within service list 120, e.g., by processor 104, then processing flows to step 206 in which packet arrival module 106 sends a message to packet departure module 110 to add the new flow to service list 120. Packet arrival module 104 may then add a flow queue to flow queues 112₁-112ₙ for the new flow. Processing then proceeds to step 208 as described below.

If the flow is found within service list 120, then processing flow to step 208. In step 208, packet arrival module 106 places the packet in its corresponding flow queue, i.e., one of flow queues 112₁-112ₙ and sends a message to pre-order queuing module 108.

In step 210, upon receiving the message, pre-order queuing module 108 notifies classifier sub-module 114 to retrieve and classify the packet from flow queues 112₁-112ₙ and classifies the packet. Classifier sub-module 114 may classify the packet (and its flow) in a wide variety of ways. For example, classifier sub-module 114 may classify the packet based upon: a source address, a destination address, or other information such as a service class (e.g., constant bit rate), transport control protocol port, etc. Other information may also be used by classifier sub-module 114 to classify the packet.

In step 212, classifier sub-module 114 places the packet in priority queues 116₁-116_z within priority queuing sub-module 115 based upon the packet's classification. Upon the placement of the packet in priority queues 116₁-116_z, pre-order queuing module 108 sends a message to packet departure module 110. The message may include the size of the packet and the priority queue, i.e., one of priority queues 116₁-116_z, into which the packet was placed. Processing then returns to step 200, where the process for scheduling packets repeats.

Figure 3:
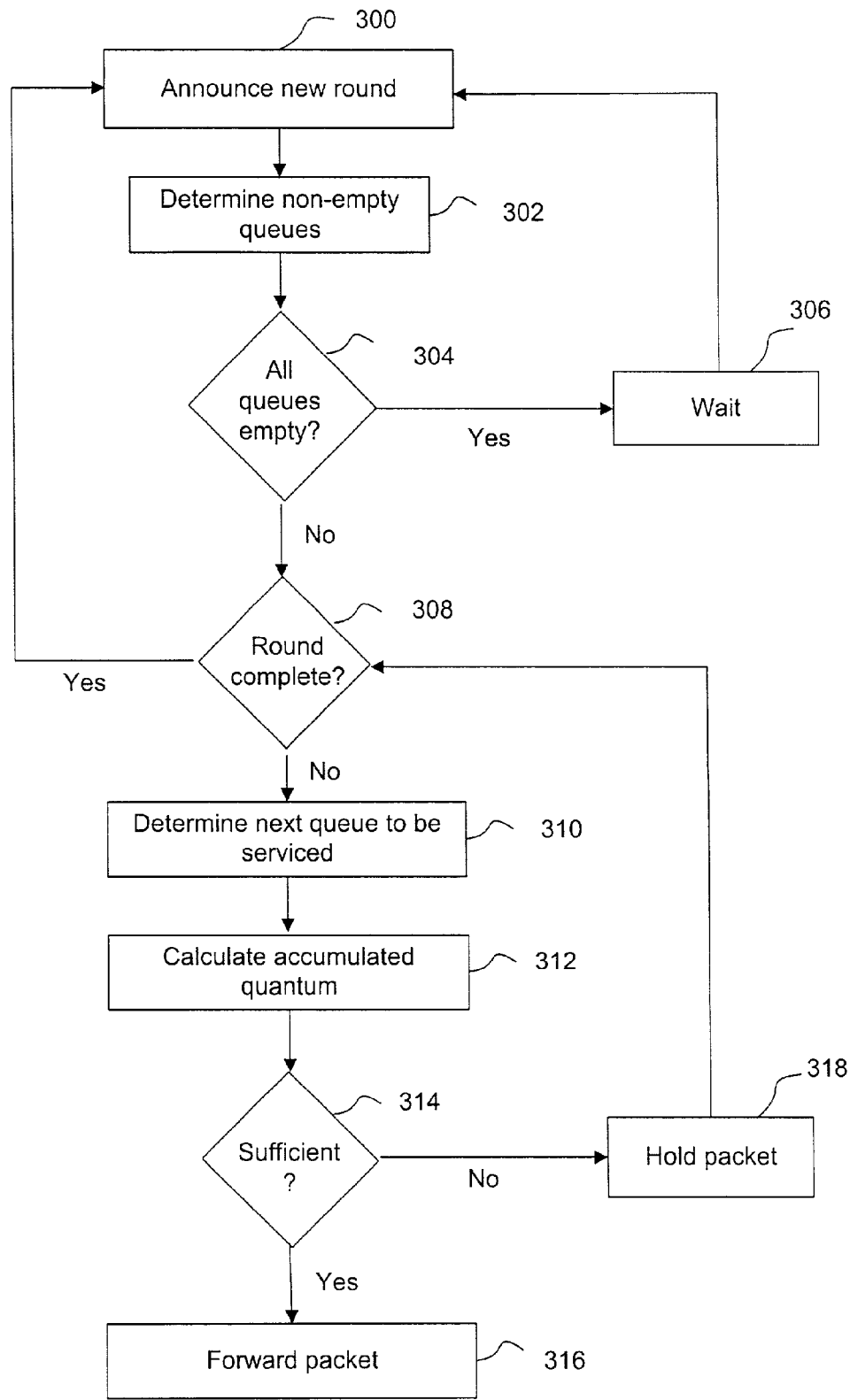
FIG. 3 shows a method of transmitting packets in accordance with principles of the present invention.

FIG. 3 shows a method of transmitting packets in accordance with the principles of the present invention. In particular, in step 300, server sub-module 118 sends a message announcing a new round, e.g., to pre-order queuing module 108 via processor 104. Server sub-module 118 may announce a new round at various times, e.g., upon packet departure module 110 receiving a message that there are packets in priority queuing sub-module 115 and/or at predetermined intervals.

In step 302, server sub-module 118 determines which priority queues among priority queues $116_1$-$116_z$ are non-empty (i.e., have packets placed within them). Server sub-module 118 may determine the non-empty queues by searching service list 120.

In step 304, server sub-module 118 confirms that there are non-empty priority queues. If all priority queues $116_1$-$116_z$ are empty, then processing proceeds to step 306. Otherwise, processing proceeds to step 308. In step 306, server sub-module 118 waits to announce a new round. Server sub-module 118 may wait to receive a message from pre-order queuing module 108. Alternatively, server sub-module 118 may wait for a predetermined period of time. However, any type of wait period and/or initiation of a new round is within the principles of the present invention.

In step 308, server sub-module 118 determines whether the current round is complete. For example, a round may be complete upon server sub-module 118 servicing all non-empty priority queues. If the round is complete, then processing flows back to step 300 where a new round is announced.

If the round is not complete, then processing flows to step 310 in which the server sub-module 118 determines a priority queue to service next. Server sub-module 118 may determine the next priority queue to service such that the priority queue among priority queues $116_1$-$116_z$ with the highest priority is serviced before serving lower priority queues. Alternatively, server sub-module 118 may service priority queues $116_1$-$116_z$ in a rotating fashion.

In one embodiment, a complete binary tree (called min_heap in the pseudo code), is used to enable server sub-module 118 to efficiently determine which non-empty priority queue among priority queues $116_1$-$116_z$ has the highest priority. For example, referring now to the pseudo code PKT_Pass and PKT_Departure described above, once packets are placed into priority queuing sub-module 115 (e.g., by PKT_Pass) the status of the event $EV_{minheap}$ is signaled to notify packet departure module 110 (e.g., PKT_Departure) to send out a packet. After transmission is complete, ServerIdle is signaled and PKT_Departure repeats the last action until the $Pq_{MinHeapRoot}$ is empty. The function MH_Delete may then delete the root node of the binary tree (i.e., min_heap) and set MinHeapRoot to the smallest j among residual nodes. When the min_heap is empty, i.e., all $Pq_j$'s are empty, PKT_Departure may declare the arrival of a new round by adding 1 to $Round_{sys}$. For all non-empty Fq's, i.e., flows with packets remaining in the last round, PKT_Departure may update DeficitCounters according to the sequence in the service list (e.g., AckList) and request that PKT_Pass classify the eligible packets into the priority queuing sub-module 115.

In step 312, server sub-module 118 calculates the accumulated quantum (i.e., as indicated by DeficitCounter) for the packet. In step 314, server sub-module 118 then determines whether the packet will be sent out during the current round. For example, If the packet's size is smaller than $DeficitCounter_i^j$, server sub-module 118 decreases $DeficitCounter^j$ by the packet size and processing proceeds to step 316 where server sub-module 118 sends the packet out, e.g., via output port 122. Alternatively, server sub-module 118 may reset $DeficitCounter_i^j$ to zero, i.e., the residual quantum remaining from the previous round cannot be carried over to avoid delaying service to other priority queues. In addition, during progress of a particular round, if a packet arrives in a priority queue having a higher priority than the priority queue currently being serviced, then server sub-module 118 may service the higher priority queue out of order within the round and send the packet out before any other packets from lower priority queues are sent out.

If the packet's size is larger than $DeficitCounter_i^j$, then processing proceeds to step 318 where server sub-module 118 may hold the packet until a subsequent round. Server sub-module 118 may repeatedly hold the packet until the size of the head packet is larger than $DeficitCounter_i^j$, i.e., there is insufficient residual quantum to serve a subsequent packet, or there are no remaining packets in the priority queue. During a subsequent round, the next time the priority queue gets its turn, server sub-module 118 may send out additional $DeficitCounter_i^j$ bytes of data in addition to $quantum_i$ bytes.

Figure 4A:
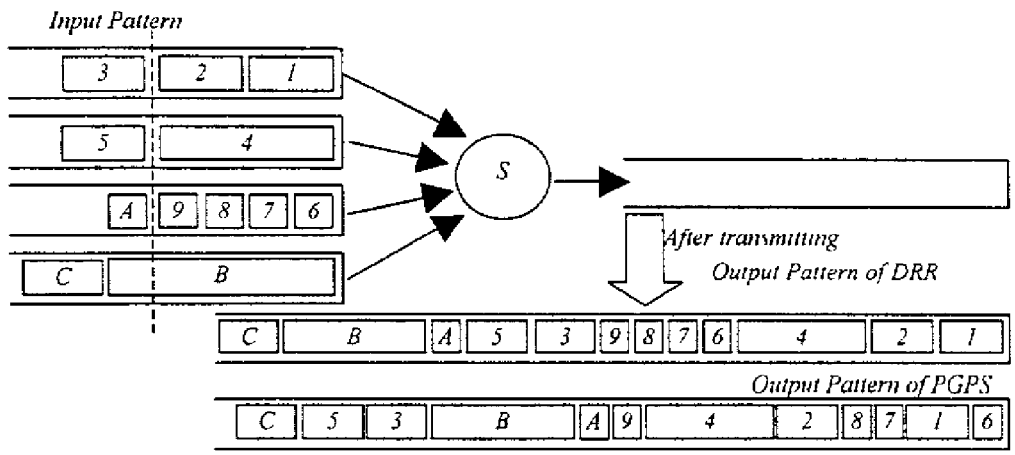
FIG. 4a illustrates the operation of Deficit Round Robin (DRR) in comparison with weighted fair queuing (WFQ)

FIG. 4a illustrates the operation of Deficit Round Robin (DRR) in comparison with weighted fair queuing (WFQ). As shown in FIG. 4a, there are four flows requesting the same amount of bandwidth and having fixed, but heterogeneous packet sizes. The same quantum is assigned to all of them and, according to the known DRR algorithms, the quantum should be equal to the largest maximum packet size among all flows. Packets 1, 4, 6, and B arrive at the same time and all have greedy flow sources, i.e., all flows are heavily backlogged. By comparing the output pattern in DRR with that in WFQ shown in FIG. 4a, three problems may be observed. First, packets 1, 4 and 6 were transmitted under DRR out of sequence (i.e., in comparison to WFQ such as 6, 1 and 4) since DRR only considers whether a packet could be sent out in a round and does not consider eligible transmission sequence for packets. Second, packets 6, 7, 8 and 9 are sent out in a batch under DRR, which in terms of latency and fairness is not considered good behavior in a packet switched network. Third, the transmission time of packet B (with a size slightly greater than the residual credits of the first round) is delayed under DRR until the next round, i.e., after all other flows finish their transmissions in the second round, which may be too long a delay. Under DRR, the delay increases with the frame size and a larger quantum size produces larger frame size.

Figure 4B:
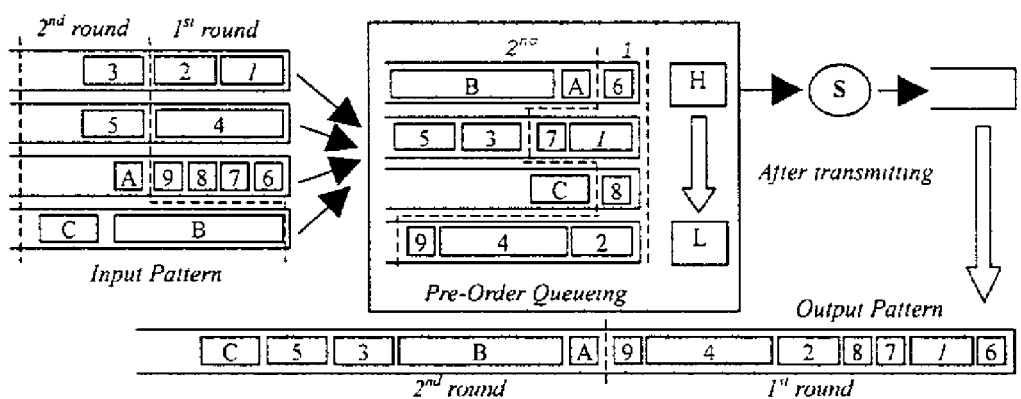

FIG. 4b shows an embodiment consistent with the present invention using Pre-Order Deficit Round Robin and operating on the same input pattern and assumptions used in FIG. 4a. In this example, packets are classified into 4 classes, so that Z=4. Assuming for all flows the quantums are equal to 400 and the size of packet B is 500, then packet B cannot be sent out in the first round. However, in the next round, DeficitCounter would be equal to 300, i.e. 400+400−500. In accordance with the present invention, the packet would then be classified into the first class, i.e., 4−⌊300/(400/4)⌋ and could be sent out at the beginning of the next round. Other packets are put into the priority queuing sub-module 115 according to the same rule. Thus, as shown in FIG. 4b, even under the assumption that all flows are heavily backlogged and there are enough priority queues, embodiments consistent with the present invention exhibit good performance in comparison to the typical DRR performance.

Below, the performance of PDRR is analyzed in terms of delay bound and throughput fairness. Under the analysis below, PDRR is shown to have an O(1) per-packet time complexity in most case. In particular, consider a queuing system with a single server of rate C.

Definition 2: A backlogged period for flow i is any period of time during which flow i is continuously backlogged in the system. Time $t_0$ is the beginning of a backlogged period of flow i and $t_k$ indicates the time that the kth round in PDRR is completed. $W_i(\tau,t_k)$ denotes the service offered to flow i in the interval $(\tau,t_k]$ by the server and $L_i$ is the maximum packet size of flow i.

Lemma 3: Under PDRR, if flow i is continuously backlogged in the interval $(t_0,t_k]$ then at the end of the kth round, $$W_i(t_0,t_k) \geq k\phi_i - D_i^k, \tag{9}$$

where $D_i^k$ is the value of the DeficitCounter$_i$ at the end of the kth round and $\phi_i$ is Quantum$_i$.

Lemma 4: Let $t_0$ be the beginning of a backlogged period of flow i in PDRR. At any time t during the backlogged period, $$W_i(t_0, t) \geq \max\left(0, r_i\left(t - t_0 - \frac{\left(2 + \frac{1}{Z}\right)F - \phi_i}{C}\right)\right), \tag{10}$$

where F is equal to $$\sum_{1}^{\#flow} \phi_i,$$

Z is the number of priority queues, and $r_i$ is the rate allocated to the flow i.

Theorem 1: The PDRR server belongs to LR with latency $\theta^{PDRR}$ less than or equal to $$\frac{\left(2 + \frac{1}{Z}\right)F - \phi_i}{C}. \tag{11}$$

According to equation (1), replacing F with $\phi_i C/r_i$ in equation (11) results in $$\theta^{PDRR} \leq \left(2 + \frac{1}{Z}\right)\frac{\phi_i}{r_i} - \frac{2\phi_i}{C}. \tag{12}$$

Equation (11) shows that PDRR improves latency, as opposed to the DRR whose latency is $(3F-2\phi_i)/C$. Furthermore, in the worst case, if the form of $\theta^{SCFQ}$ is translated to the form of $\theta^{PDRR}$, the latency of PDRR is shown to be similar to that of SCFQ, which is $(2F-\phi_i)/C$. Equation (12) demonstrates that the latency of PDRR is inversely dependent with the allocated bandwidth, and independent of the number of active flows.

Theorem 2: The scheduling algorithm at the server is PDRR and the traffic of flow i conforms to a leaky bucket with parameters $(\sigma_i,\rho_i)$, where $\sigma_i$ and $\rho_i$ denote the burstiness and average rate of the flow i, respectively. The rate allocated to the flow i is assumed to be equal to $\rho_i$. If Delay $_i$ is the delay of any packet of flow i, then $$\text{Delay}_i \leq \frac{\sigma_i}{\rho_i} + \frac{\left(2 + \frac{1}{Z}\right)F - \phi_i}{C}. \tag{13}$$

Theorem 3: For a PDRR scheduler, $$\text{Fairness}^{PDRR} = \frac{\left(2 + \frac{1}{Z}\right)F}{C}, \tag{14}$$

where Fairness$^{PDRR}$ is the fairness of the server PDRR. Thus, Fairness$^{PDRR}$ is smaller than Fairness$^{DRR}$, which is 3F/C.

As noted in the analysis above, for each packet, PKT_Arrival inserts the packet into its corresponding Fq and PKT_Pass takes the packet from its Fq to the Pq$_j$ where j is found in a constant number of operations. PKT_Departure repeatedly picks a packet from the Pq$_{MinHeapRoot}$ whose MinHeapRoot always

TABLE 4

THE TRAFFIC PARAMETERS AND QUANTUM SIZE OF TWO GROUPS

| Group | Traffic Type | Bit Rate (Mbps) | Packet Size (byte) | Quantum Size (byte) |
|---|---|---|---|---|
| GA | CBR | 4 | 50 | 500 |
| GB | CBR | 4 | 500 | 500 | presents the smallest j among non-empty Pq$_j$'s. As the min heap operations are not invoked under the assumption that each accessed Pq is non-empty, all the complexities of the above operations are O(1). When the Pq$_{MinHeapRoot}$ is empty, a delete operation of the min heap is invoked by PKT_Departure to get the new MinHeapRoot. The reheapification loop has time complexity O(log Z), where Z is the maximum number of keys present in the "min heap", i.e., the number of non-empty Pq's at that moment. A similar situation also occurs as PKT_Pass must insert a new j into the min heap. Above, Table 4 summarizes the complexity of PKT_Arrival, PKT_Pass, PKT_Departure when a non-empty or empty priority queue is accessed.

However, embodiments consistent with the present invention allow for packets to be sent out individually and have low delay possibility by operations of the min heap. First, the min heap operation may be involved when the accessed Pq is empty. In contrast, sorted-priority algorithms, e.g., SCFQ and WFQ, use two operations, insert and delete, repeatedly when a packet is being sent out. Secondly, embodiments consistent with the present invention allow for the scalar of the min heap to be small such that the maximum number of keys is the number of Pq's instead of the number of flows. Moreover, embodiments consistent with the present invention allow concurrent insertions and deletions on the heap. According to the principles of the present invention, PKT_Departure, after getting the next smallest value j immediately via one comparison between the two leaf keys of the root, can start to send out packets in the Pq$_j$ concurrently during the period of the reheapification loop. Therefore, the time complexity of PDRR in accordance with the present invention is O(1) in most cases and O(log Z) in some special cases. Accordingly, embodiments consistent with the present invention utilize an algorithm with a lower complexity than algorithms such as SCFQ, which requires O(log N) operations where N is the number of flows.

FIGS. 5-8 show various simulation results to compare the performance of embodiments consistent with the present invention using PDRR, with DRR and SCFQ. For the simulation, the link bandwidth, i.e., server capacity, was assumed to be 80 Mbps, shared by 20 flows. The 20 flows were divided into two groups, GA and GB. The following experiment was performed to show the problem of bursty transmission by DRR and the improvement effected by PDRR. The traffic sources were assumed to be Constant Bit Rate (CBR) with fixed packet size. Below, Table 5 indicates the traffic parameters of the two groups, GA and GB.

TABLE 5

| | Operation | | |
|---|---|---|---|
| Case | PKT ARRIVAL | PKT PASS | PKT DEPARTURE |
| Pq non-empty | O(1) | O(1) | O(1) |
| P empty | O(1) | O(log Z) | O(log Z) |

Furthermore, the bit rates of GA and GB were set equal, the maximum packet size among both groups was 500 bytes, and the same quantum size of 500 bytes was allocated to them. The packet arrival rate of GA flows was 10 times the size of GB. In this experiment, 10 priority queues were used. The delay time of a particular GA flow under DRR, PDRR, and SCFQ, respectively were measured.

Figure 5:
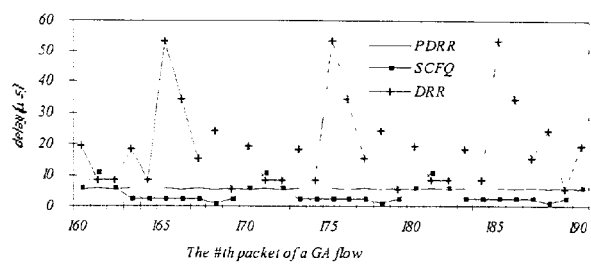
FIGS. 5-8 show various simulation results to compare the performance of embodiments consistent with the present invention using PDRR with DRR and SCFQ.

As shown in FIG. 5, packets of flow within DRR are sent out in a batch once the flow is served. In PDRR the flow is able to spend its quantum in several pieces, so that packets could be sent out uniformly. Another observation is that packets in SCFQ suffer high delay jitter, which is due to GA flows having a packet arrival rate ten times that of the GB flow. Further, for GA packets that arrive while the server is serving a large packet of GB, their virtual arrival times are equal, which causes the server not to send them out in their actual arrival sequence.

Figure 6:
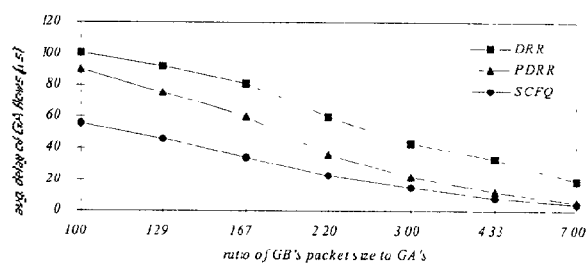

As shown in FIG. 6, the GA flow in DRR has a larger average delay than that in PDRR. The traffic source was assumed to be shaped by a leaky bucket with on/off rates are both 1000 1/μsec and a bit rate of 4 Mbps. The GA flows were assigned a larger packet size than GB flows, however all flows requested the same bandwidth. With the increase of GA's packet size to that of GB's, the curve of PDRR in FIG. 6 shows that PDRR performs well, especially with heterogeneous traffic sources.

Figure 7:
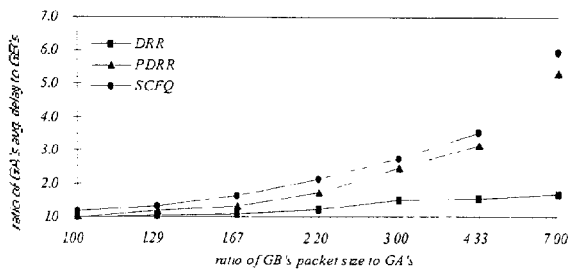
Figure 8:
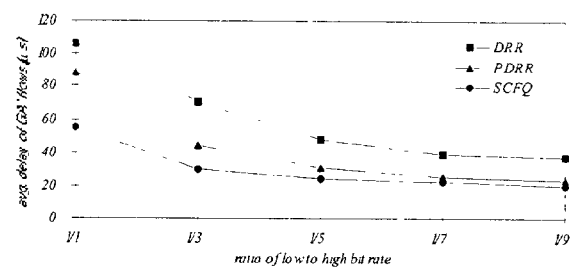

FIG. 7 shows that as the ratio of GA's packet size to GB's packet size is increased, small packets in PDRR perform better than large packets, unlike the case of DRR. GA flows were assumed to have a higher bit rate than that of GB flows. Unlike DRR, PDRR considers the information provided in the quantum consumed by a packet and reorders the transmission sequence of packets in one round. Under DRR, a node only considers whether a packet could be sent out and ignores the transmission order of packets in one round. In a high flow environment with heterogeneous bandwidth requirements, embodiments consistent with the present invention using PDRR perform better than DRR because pre-order queuing module 108 can transmit packets more uniformly within a round. In addition, FIG. 8 shows that the average delay of GA flows in PDRR is lower than that in DRR.

Figure 9:
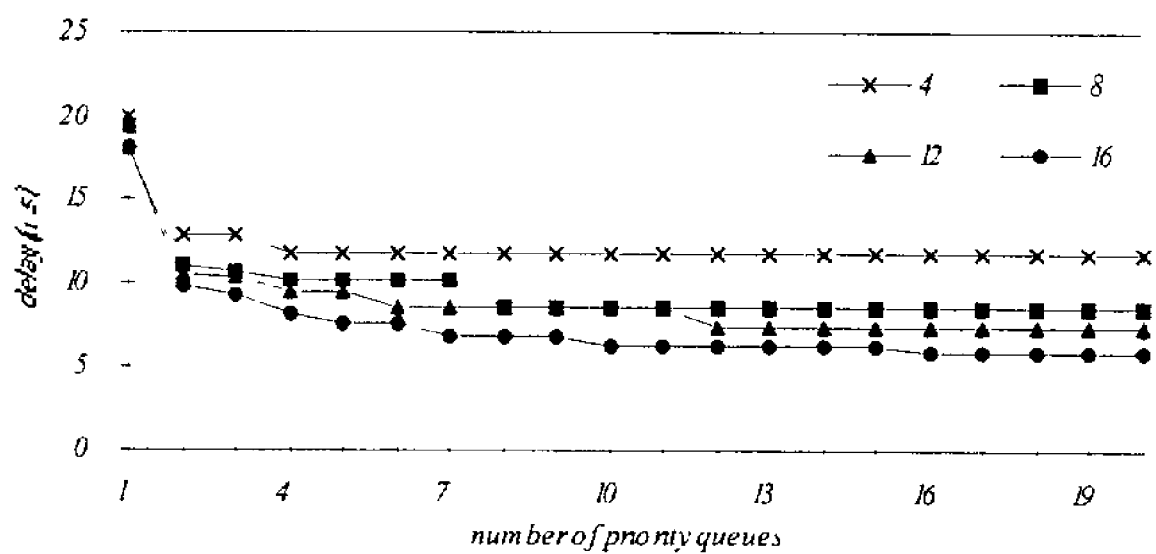
FIG. 9 shows performance consistent with the present invention as the number of priority queues is varied for a specific traffic environment.

FIG. 9 shows performance of an embodiment consistent with the present invention as the number of priority queues is varied for a specific traffic environment. As described above, embodiments consistent with the present invention enable a flow to use its quantum uniformly within a round, especially when its quantum is several times its maximum packet size. For example, for a flow i, pre-order queuing with $(Quantum_i/L_i)$ priority queues can reach the above goal. Thus, for a specific traffic environment, Z priority queues are sufficient where Z is equal to the maximum value of $(Quantum_i/L_i)$ among all flows, i.e.

$$\max_i(Quantum_i/L_i).$$

FIG. 9 shows experimental data illustrating the relationship between Z and $$\max_i(Quantum_i/L_i).$$

All traffic sources were assumed as CBR with fixed packet size. FIG. 9 shows the average delay of the flow whose $(Quantum_i/L_i)$ equals $$\max_i(Quantum_i/L_i).$$

For each line, this flow receives the smallest average delay when $$Z = \max_i(Quantum_i/L_i),$$

which confirms the advantages realized through practice of the present invention.

The present invention may also apply to flows with different allocated bandwidth but having the same distribution of packet sizes. Traffic types, other than CBR and MMPP, are also within the principles of the present invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

APPENDIX: PROOFS OF PRIMARY RESULTS

Proof of Lemma 1: This is proved by showing that for any packet $P_i^m$, its DeficitCounter$_i^m$ must be positive and smaller than Quantum$_i$. The value in DeficitCounter cannot be negative and could only increase by Quantum$_i$ in the UpdateOneFlow procedure. It is assumed that there is insufficient credit to send out the packet $P_i^m$, i.e., the DeficitCounter$_i^{m-1}$ is smaller than $L_i^m$, the size of this packet. After updating and sending out the packet $P_i^m$, DeficitCounter$_i^m$=DeficitCounter$_i^{m-1}$+Quantum$_i$-$L_i^m$.

As DeficitCounter$_i^{m-1}$<$L_i^m$, DeficitCounter$_i^m$ must be smaller than Quantum$_i$. As a result, lemma 1 is proved.

Proof of lemma 2: According to equation (6), equation (5) is equivalent to $$QA_i^m = QA_i^{m-1} - \frac{L_i^m}{\text{Quantum}_i} \quad (A.1)$$

Since $L_i^m > 0$, $\text{Quantum}_i > 0$ and $r_i > 0$, from equation (3) and equation (A.1) for any m $$TS_i^m > TS_i^{m-1}$$

and $$QA_i^{m-1} > QA_i^m.$$

In the same round, for the packet $P_i^m$ with the smallest timestamp, its m is smallest among all packets, and the $QA_i^m$ of the packet with the smallest m. Thus, for the packet with the smallest timestamp in one round, its QA is the largest.

Proof of Lemma 3: PDRR only modifies the service sequence of the packets in a DRR round. Therefore, the packets in DRR that could be sent out in a round during a backlogged period, can still be sent out in the same PDRR round.

Proof of Lemma 4: For each time interval $(t_{k-1}, t_k]$, $$t_k - t_{k-1} \leq \frac{1}{C}\left(F + \sum_{j=1}^{N} D_j^{k-1} - \sum_{j=1}^{N} D_j^k\right) \quad (A.2)$$

By summing over k−1, $$t_{k-1} - t_0 \leq (k-1)\frac{F}{C} + \frac{1}{C}\sum_{j=1}^{N} D_j^0 - \frac{1}{C}\sum_{j=1}^{N} D_j^{k-1}. \quad (A.3)$$

It is assumed there are two packets, $P_i^A$ and $P_i^B$, in the $Fq_i$ whose sizes are $L_i^A$ and $L_i^B$, ($L_i^B = \phi_i$), respectively, and only $P_i^A$ can be sent out at the (k−1)th round. All other flows exhaust their DeficitCounter. Thus, $D_i^{K-1} = \phi_i - \Delta$ where $0 < \Delta \leq \phi_i$, $D_j^{k-1} = 0$ for $j \neq i$, and $$t_{k-1} - t_0 \leq (k-1)\frac{F}{C} + \frac{F - \phi_i + \Delta}{C}. \quad (A.4)$$

Under this assumption, in the kth round $P_i^B$ would be placed into the $Pq_n$ where $$n = Z - \left\lfloor \frac{D_i^K}{Pqg_i} \right\rfloor \quad (A.5)$$

$$= Z - \left\lfloor \frac{D_i^{K-1} + \phi_i - L_i^B}{\phi_i/Z} \right\rfloor$$

$$= Z - \left\lfloor \frac{D_i^{K-1}}{\phi_i} Z \right\rfloor$$

$$= Z - \left\lfloor \frac{\phi_i - \Delta}{\phi_i} Z \right\rfloor$$

$$= Z - \left\lfloor Z - \frac{\Delta}{\phi_i} Z \right\rfloor$$

$$= \left\lceil \frac{\Delta}{\phi_i} Z \right\rceil$$

and the maximum amount of data that could be served before $P_i^B$ is $((n/Z)F - \phi_i)$. Thus, for any time t from the beginning of the kth round until the $P_i^B$ is served, $$t - t_0 \leq \frac{\frac{n}{Z}F - \phi_i}{C} + t_{k-1} - t_0 \quad (A.6)$$

$$\leq (k-1)\frac{F}{C} + \frac{F - \phi_i + \Delta}{C} + \frac{\frac{n}{Z}F - \phi_i}{C},$$

or equivalently, $$k - 1 \geq \frac{(t - t_0)C}{F} + \frac{2\phi_i - \Delta}{F} - \frac{n}{Z} - 1. \quad (A.7)$$

Replacing k with k−1 in equation (9) and defining $r_i$, the reserved rate of flow i, as $(\phi_i C/F)$, results in $$W_i(t_0, t_{k-1}) \geq \phi_i\left(\frac{(t-t_0)C}{F} + \frac{2\phi_i - \Delta}{F} - \frac{n}{Z} - 1\right) - D_i^{k-1} \quad (A.8)$$

$$= r_i\left(t - t_0 + \frac{2\phi_i - \Delta}{C} - \frac{n}{Z} \times \frac{F}{C} - \frac{F}{C} - \frac{D_i^{k-1}}{r_i}\right)$$

$$= r_i\left(t - t_0 - \left(1 + \frac{n}{Z} + \frac{D_i^{k-1}}{\phi_i}\right)\frac{F}{C} + \frac{2\phi_i - \Delta}{C}\right)$$

$$= r_i\left(t - t_0 - \frac{\left(1 + \frac{n}{Z} + \frac{D_i^{k-1}}{\phi_i}\right)F - 2\phi_i + \Delta}{C}\right)$$

Replacing $D_i^{k-1}$ with $\phi_i - \Delta$ and since $$\frac{n}{Z} - \frac{\Delta}{\phi_i} = \left\lceil \frac{\Delta}{\phi_i} Z \right\rceil \frac{1}{Z} - \frac{\Delta}{\phi_i} \leq \frac{1}{Z}$$

for any $\Delta$, $$W_i(t_0, t_{k-1}) \geq r_i\left(t - t_0 - \frac{\left(2 + \frac{n}{Z} - \frac{\Delta}{\phi_i}\right)F - 2\phi_i + \Delta}{C}\right) \quad (A.9)$$

$$\geq r_i\left(t - t_0 - \frac{\left(2 + \frac{1}{Z}\right)F - \phi_i}{C}\right).$$

In the worst case, flow i was the last to be updated during the kth round and its packet $L_i$ is inserted into the tail of $Pq_n$. The following two cases are considered:

Case 1: At time t before the time that flow i is served in the kth round, i.e.

$$t_{k-1} < t \le t_{k-1} + \frac{n}{Z}F - \phi_i,$$

there results $$W_i(t_0,t) = W_i(t_0,t_{k-1}). \quad (A.10)$$

Case 2: At time t after the time that flow i starts being served in the kth round, i.e.

$$t_{k-1} + \frac{n}{Z}F - \phi_i < t \le t_{k_i},$$

there results $$W_i(t_0,t) = W_i(t_0,t_{k-1}) + W_i(t_{k-1},t) \ge W_i(t_0,t_{k-1}). \quad (A.11)$$

Thus, for any time t, $$W_i(t_0, t) \ge \max\left(0, r_i\left(t - t_0 - \frac{\left(2+\frac{1}{Z}\right)F - \phi_i}{C}\right)\right). \quad (A.12)$$

Proof of Theorem 3: The beginning of the kth round is assumed and there are two packets $P_i^A$ and $P_i^B$ in the $Fq_i$ whose sizes are $L_i^A$ and $\phi_i$, respectively, and only $P_i^A$ can be sent out at the kth round. The packet $P_i^B$'s class is n, which implies it will enter the nth priority queue. In the (k+1) round, all packets of another flow j whose classes are larger than n, could not be sent out before the time t when $P_i^B$ is sent out, as the server always selects packets from the nonempty $Pq_j$ with the smallest j. Thus, before t, for another flow j, $$W_j(t_0, t) \le k\phi_j + \frac{n}{Z}\phi_j. \quad (A.13)$$

Also as $t_k < t < t_{k+1}$, from equation (9) for flow i, $$W_i(t_0,t) \ge (k-1)\phi_i + \Delta. \quad (A.14)$$

From equations (A.5), (A.13) and (A.14) it is concluded that $$\left|\frac{W_i(t_0, t)}{r_i} - \frac{W_j(t_0, t)}{r_j}\right| \le \left(k + \frac{n}{Z}\right)\frac{\phi_j}{r_j} - (k-1)\frac{\phi_i}{r_i} - \frac{\Delta}{r_i} \quad (A.15)$$

$$\le \left(1 + \frac{n}{Z} - \frac{\Delta}{\phi_i}\right)\frac{F}{C} \le \left(1 + \frac{1}{Z}\right)\frac{F}{C}.$$

This bound applies to time intervals that began at $t_0$. For any arbitrary interval, $$\left|\frac{W_i(t_1, t_2)}{r_i} - \frac{W_j(t_1, t_2)}{r_j}\right| \le \left(2 + \frac{1}{Z}\right)\frac{F}{C}. \quad (A.16)$$

Thus, for any two flows i and j, $$\text{Fairness}^{PDRR} = \frac{\left(2+\frac{1}{Z}\right)F}{C}. \quad (A.17)$$

What is claimed is:

1. A method for scheduling a packet, comprising the steps of:
   receiving a packet having a size;
   identifying a flow for said packet by at least a flow identifier;
   classifying said packet based on said identified flow;
   buffering said packet in one of a plurality of queues, arranged in a priority order, based on said classification of said packet and a priority of said packet assigned based on said priority order;
   allocating a predetermined amount of bandwidth to said identified flow;
   determining an accumulated bandwidth based on said predetermined amount of bandwidth; and
   processing said packet in the one of the plurality of queues based on said accumulated bandwidth and said size of said packet.

2. The method of claim 1, wherein identifying said flow for said packet comprises identifying a source address of said packet.

3. The method of claim 1, wherein identifying said flow for said packet comprises identifying a destination address of said packet.

4. The method of claim 1, wherein classifying said packet comprises:
   calculating said size of said packet; and
   calculating said accumulated bandwidth assigned to said flow based upon said size of said packet.

5. The method of claim 4, wherein calculating said accumulated bandwidth is based upon predetermined amount of bandwidth assigned to said flow and said size of said packet.

6. The method of claim 1, wherein buffering said packet in one of said plurality of queues comprises:
   arranging said plurality of queues in a priority order;
   assigning a priority to said packet based on said priority order; and
   buffering said packet in one of said queues based on said assigned priority.

7. The method of claim 6, wherein assigning a priority to said packet based on said priority order comprises;
   determining said size of said packet; and
   calculating a transmission delay based on said size of said packet and said priority order.

8. The method according to claim 1, further including:
   calculating a residual bandwidth after said processing;
   allocating a second predetermined amount of bandwidth to said identified flow; and
   recalculating said accumulated bandwidth based on said residual bandwidth and said second predetermined amount of bandwidth.

9. The method according to claim 8, wherein:
   said residual bandwidth is determined as a difference between said accumulated bandwidth and a total amount of data of packets processed; and
   said accumulated bandwidth is recalculated as a summation of said residual bandwidth and said second predetermined amount of bandwidth.

10. A system for scheduling a packet, comprising;
an input to receive a plurality of packets;
an arrival module to identify a flow for each of said plurality of packets by at least a flow identifier;
a classifier to assign each of said plurality of packets to one of a plurality of queues, arranged in a priority order, based on said identified flow;
a server for allocating a predetermined amount of bandwidth to said identified flow, determining an accumulated bandwidth based on said predetermined amount of bandwidth, and selecting one of said plurality of queues based on said priority order; and
an output for outputting a packet from said selected queue based on said accumulated bandwidth of said identified flows, a priority of said packet assigned based on said priority order, and said size of said packet.

11. The system of claim 10, further comprising:
a memory to store a service list of flows identified for each of said plurality of packets.

12. An apparatus for scheduling a packet, comprising:
means for receiving a packet having a size;
means for identifying a flow for said packet by at least a flow identifier;
means for classifying said packet based on said identified flow;
means for buffering said packet in one of a plurality of queues, arranged in a priority order, based on said classification of said packet and a priority of said packet assigned based on said priority order;
means for allocating a predetermined amount of bandwidth to said identified flow;
means for determining an accumulated bandwidth based on said predetermined amount of bandwidth; and
means for processing said packet in the one of the plurality of queues based on the accumulated bandwidth and said size of said packet.

13. A program on a computer readable medium for configuring a processor to execute a method for scheduling a packet, said method comprising the steps of:
receiving a packet having a size;
identifying a flow for said packet by at least a flow identifier;
classifying said packet based on said identified flow;
buffering said packet in one of a plurality of queues, arranged in a priority order, based on said classification of said packet and a priority of said packet assigned based on said priority order;
allocating a predetermined amount of bandwidth to said identified flow;
determining an accumulated bandwidth based on said predetermined amount of bandwidth; and
processing said packet in the one of the plurality of queues based on said accumulated bandwidth and said size of said packet.

* * * * *

UNITED STATES PATENT AND TRADEMARK OFFICE
CERTIFICATE OF CORRECTION

PATENT NO. : 7,236,491 B2
APPLICATION NO. : 09/955296
DATED : June 26, 2007
INVENTOR(S) : Shih-Chiang Tsao et al.

It is certified that error appears in the above-identified patent and that said Letters Patent is hereby corrected as shown below:

Column 19, line 15, "flows", should read --flow--.

Signed and Sealed this

Twenty-first Day of August, 2007

JON W. DUDAS
*Director of the United States Patent and Trademark Office*